United States Patent [19]

Tamminen

[11] Patent Number: 4,715,934
[45] Date of Patent: Dec. 29, 1987

[54] PROCESS AND APPARATUS FOR SEPARATING METALS FROM SOLUTIONS

[75] Inventor: Pentti Tamminen, Espoo, Finland

[73] Assignee: LTH Associates, Helsinki, Finland

[21] Appl. No.: 799,009

[22] Filed: Nov. 18, 1985

[51] Int. Cl.$^4$ ............................ C25C 5/02; C25C 7/00
[52] U.S. Cl. ........................................ 204/10; 204/212
[58] Field of Search ........................ 204/10, 212, 216

[56] References Cited

U.S. PATENT DOCUMENTS

| | | | |
|---|---|---|---|
| 3,591,466 | 7/1971 | Heiman | 204/16 |
| 3,783,110 | 1/1974 | Ahmad | 204/12 |
| 3,822,149 | 7/1974 | Hale | 429/17 |
| 3,827,962 | 8/1974 | Ohmad | 204/212 |
| 4,028,199 | 6/1977 | Holland | 204/10 |
| 4,521,497 | 6/1985 | Tamminen | 429/27 |

FOREIGN PATENT DOCUMENTS 801397  9/1958  United Kingdom ................ 204/10

Primary Examiner—T. M. Tufariello
Attorney, Agent, or Firm—Wolf, Greenfield & Sacks

[57] ABSTRACT

Process and apparatus for separating metal from a solution in which the metal has been dissolved by use of an electrochemical cell having a cathode electrode with a metal-collecting face. A substantial centrifugal force is applied to the metal-collecting face, the centrifugal force having a substantial component in a direction perpendicular to an outward from said face, whereby metal is deposited on said face as nodules of substantially uniform shape and size. The above may be utilized in a continuous electrowinning process where the nodules are permitted to grow until they reach a size where, under the action of the centrifugal force, they break off from the metal-collecting face and are removed from the cell or may be used in a storage battery and in particular in connection with the charging thereof.

39 Claims, 5 Drawing Figures

PROCESS AND APPARATUS FOR SEPARATING METALS FROM SOLUTIONS

This invention relates to a method and apparatus for separating and depositing metals from a solution containing ions of such metal and more particularly to a metal separation method and apparatus utilizing centrifugal force to control the metal deposition and suitable for use with a rechargeable battery.

BACKGROUND OF THE INVENTION

There are many applications where a metal is dissolved in a solution during an industrial process and it is desired either for reclaimation or other purposes to separate the metal from the solution. Examples of such applications include the electrowinning of metals from solutions in which such metals have become deposited during various industrial processes and the redepositing of metal from the electrolyte of a battery during the charging of the battery.

A problem in the deposition of metals from a solution in an electrochemical cell is that the dendritic or mossy growth of the metal layer results in a porous and uneven deposit which can span the interelectrode gap and short circuit the cell if the cell is either run for any substantial period of time or after a relatively short number of charge-discharge cycles of a storage battery. Good results in overcoming this problem and in achieving dense and homogeneous deposits have been acheived by utilizing various techniques to increase the relative movement between the negative electrodes and the electrolyte and/or to increase the mass of metal from the electrolyte solution in the immediate area of the negative electrode. These objectives have been obtained in for example U.S. Pat. No. 3,783,110 (issued Jan. 1, 1974 to I. Ahmad and entitled "Process for Electrodeposition of Metals Under the Influence of a Centrifugal Force Field") by creating a very high centrifugal force which is directed towards and substantially perpendicular to the metal-collecting face of the negative electrode. U.S Pat. No. 3,591,466 (issued July 6, 1971 to S. Heiman and entitled "Composite Structure Production") utilizes a similar technique to produce composite materials and U.S. Pat. No. 4,521,497 (issued June 4, 1985 to P. Tamminen and entitled "Electrochemical Generators and Method for the Operation Thereof") utilizes a high centrifugal force applied to the metal-collecting face of the negative electrode during charging of an electrochemical generator to retard dendrite growth. While the techniques indicated above are suitable if all that is required is a homogeneous and dense metal deposit, they are not readily adapted to the continuous electrowinning of metal from a solution.

SUMMARY OF THE INVENTION

In accordance with this invention, it has been discovered that new and unexpected results which, among other things, permit the continuous electrowinning of metal from a solution, can be achieved by having a strong centrifugal force applied to the metal-collecting face of the negative electrode of an electrochemical cell which force has a substantial component perpendicular to such face and in a direction away from the face. Thus, this invention utilizes a centrifugal force during an electrowinning process which force is directed in the opposite direction from the direction in which such force has been directed in all known prior art applications.

More particularly, this invention relates to a process for depositing metal from an electrolyte solution which contains ions of the metal. The first step in this process is to mount at least one cathode electrode having a metal collecting face and at least one anode electrode having an inner face in a rotatable cell. The electrodes are mounted (a) with their faces substantially parallel to each other and spaced from each other by a predetermined distance, (b) oriented in the cell relative to the axis of rotation of the cell such that when the cell is rotated, the resulting centrifugal force appplied to the electrode faces has a substantial component in a direction perpendicular to said faces and (c) with the cathode electrode closer to the axis of rotation of the cell than the anode electrode so that the perpendicular component of the centrifugal force applied to the metal collecting face of the cathode electrode is in a direction away from said face. The electrolyte solution is provided to the cell in at least the space between the electrodes. The cell, and thus the electrodes and the electrolyte solution therein, is rotated about the cell's axis of rotation to generate the centrifugal force and an electric current is applied to the electrodes, resulting in the deposition of the metal on the metal-collecting face of the cathode electrode in the form of nodules of substantially uniform size and shape.

DETAILED DESCRIPTION

Figure 1:
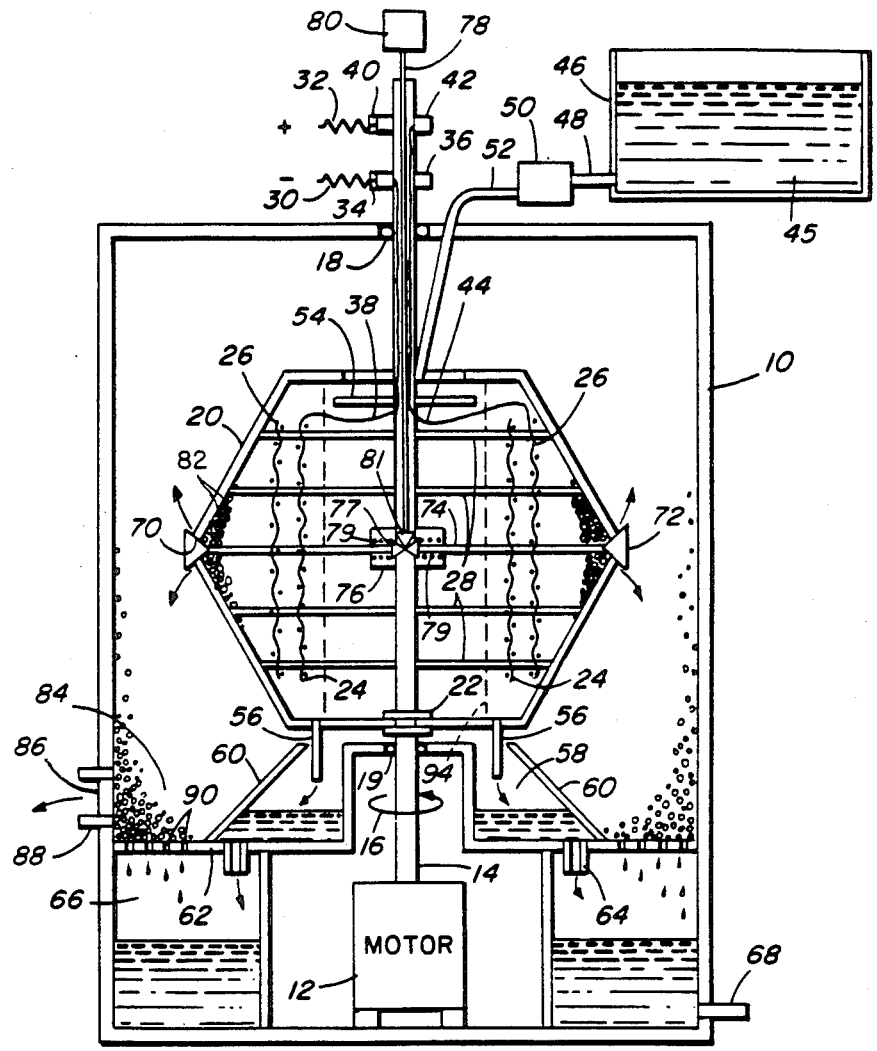
FIG. 1 is a schematic cross-sectional view of apparatus which may be used in accordance with the teaching of the invention to separate metal from a solution.

Referring to FIG. 1, apparatus for practicing the teachings of this invention includes a housing 10 which may be of metal, plastic or other suitable material. A motor 12, which is of conventional design and the control of which does not form part of the present invention, is mounted to the bottom of housing 10 at the center thereof and operates to rotate a shaft 14 which projects from the top thereof. While shaft 14 may be rotated in either direction, for purposes of this discussion, it will be assumed to rotate in the direction of arrow 16. Shaft 14 projects through the top of housing 10 and is journaled in the top of the housing 10 by bearing 18 and near motor 12 by bearing 19.

Figure 2:
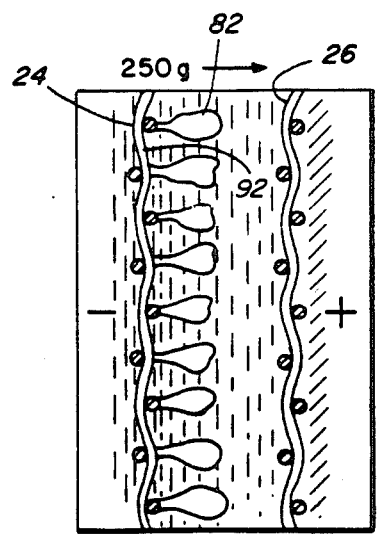
FIG. 2 is an enlarged view of a portion of the electrodes of the apparatus shown in FIG. 1 illustrating the manner in which the metal is deposited.
Figure 4:
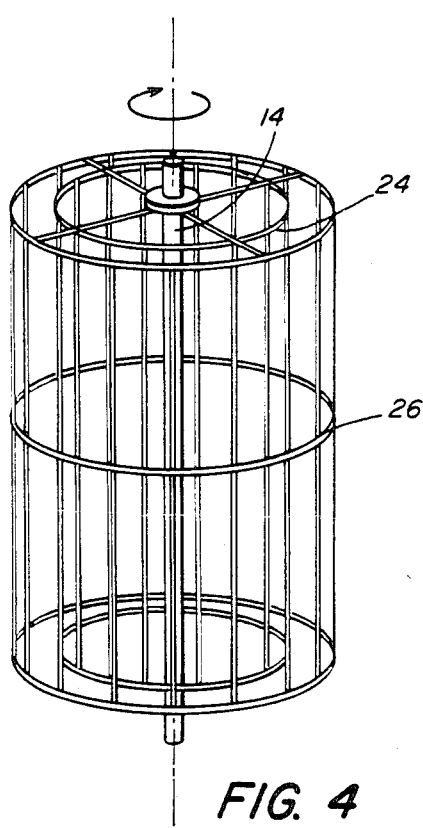
FIG. 4 is a schematic perspective view of the electrode structure for an alternative emodiment of the invention.

A cell 20, constructed of stainless steel or other material of suitable strength which would not be corroded by the electrolyte, is attached to shaft 14 by a suitable mounting element 22 and rotates with shaft 14. Mounted in cell 20 are at least one cathode electrode 24 and at least one anode electrode 26. While a plurality of discreet pairs of electrodes 24 and 26 may be mounted in cell 20, the electrodes are preferably in the form of concentric wire cylinders. The cylindrical electrodes may be wire nets or meshes as shown in FIGS. 1 and 2, squirrel-cage configurations of parallel wires as illustrated in FIG. 4 or other suitable configurations. The electrodes are formed of a suitable conducting material such as stainless steel or nickel-plated copper. For a preferred embodiment of the invention, both electrodes are meshes of stainless steel wire, the wires being 0.3 mm thick and being spaced from each other by 0.6 mm. The electrodes are supported in cell 20 by separators 28 of plastic or other suitable non-conducting material, the separators being attached to shaft 14 and to the side walls of cell 20. The spacing between the electrodes is maintained by separators 28. The extent of this spacing will vary depending on the metal being separated and on the overall dimensions of the apparatus. For an embodiment where the metal being deposited was zinc, a spacing of 3 mm between the electrodes was found to be suitable.

Electric current, from a suitable conventional source which does not form part of the present invention, is applied to wires 30 and 32. Negative current from wire 30 is applied through brush 34 to slip ring 36 on shaft 14 and through slip ring 36 to wire 38 which extends through shaft 14 and connects to cathode electrode 24. Similarly, positive current from wire 32 is applied through brush 40 and slip ring 42 to wire 44 which extends through shaft 14 to anode electrode 26. The current applied to wires 30 and 32 will vary with the metal being separated and with other factors. In a preferred embodiment with zinc being deposited, a current of 117 mA/cm$^2$ was found to be suitable.

An electrolyte solution 45 containing the metal to be deposited is stored in reservoir 46. The electrolyte flows, either under the influence of gravity or by use of a suitable pump (not shown), through tube 48, a suitable flow control device 50, and tube 52 to rotating distribution plate 54 mounted in cell 20 on shaft 14. From plate 54, the electrolyte flows under the influence of centrifugal force toward the side walls of chamber 20. Plate 54 assures a substantially uniform distribution of the electrolyte solution around the periphery of cell 20. Electrolyte solution 45 flows through cell 20 under the influence of gravity with the heavier, metal-rich, solution being forced to the outer wall of cell 20 by the centrifugal force resulting from the rotation of the cell and the lighter metal-poor electrolyte solution from which metal ions have been deposited being closest to the center (i.e., rotation axis) of the cell. The metal-poor electrolyte from the center of the cell is removed from the cell through ports 56 and is collected in chamber 58 of housing 10. chamber 58 is bounded by wall 60 and by lower wall 62. From chamber 58, the electrolyte flows through openings 64 in wall 62 to cylindrical chamber 66 formed in housing 10 and is removed from the apparatus from this chamber through tube 68. If the desired amount of metal has been removed from the electrolyte solution 45, then the solution removed through tube 68 may flow to a suitable reservoir for reuse or disposal. If it is desired to remove additional metal from the solution, the electrolyte solution exiting through tube 68 may be pumped back into reservoir 46 for recycling. The electrolyte may also be pumped through a bed of ore or used in another industrial process before being recycled.

Cell 20 also has a plurality of openings 70 formed in its outer wall in the area thereof adjacent the widest portion of the cell. There are preferably four to six openings 70 evenly spaced around the periphery of cell 20. Each opening 70 is normally sealed by a conical plug 72 which is spring-biased in the closed position by a corresponding rod 74 which extend into a box 76 mounted on shaft 14. In box 76, each rod terminates in a conical tip 77, a spring 79 positioned between tip 77 and the wall of box 76 performing the biasing function. A rod 78 activated by a solenoid 80 extends through shaft 14 into box 76 and is provided with a conical tip 81. When solenoid 80 is periodically activated from a suitable source of electric energy (in a conventional manner which does not form part of the present invention), rod 78 is lowered, causing tip 81 to be wedged between tips 77, pushing tips 77 and the rods 74 connected thereto outward, thereby moving plugs 72 outward to open openings 70. As will discussed later, in accordance with the teachings of this invention, metal nodules 82 break off from the metal-collecting face of cathode electrode 24 and, under the influence of the centrifugal force generated within cell 20, flow toward openings 70. Solenoid 80 is periodically pulsed to unplug openings 70, permitting metal nodules 82 adjacent thereto to be thrown into housing 10 where they are accumulated in area 84 of the housing. The metal nodules or granules may be continuously removed from housing 10 through opening 86 formed in the wall of the housing and tube 88. To the extent any electrolyte solution 45 is thrown out through openings 70 with the metal nodules 82, such electrolyte solution passes through openings 90 in separator wall 62 to chamber 66.

In operation, the apparatus of FIG. 1 will initially be assumed to have no electrolyte 45 therein and it will be initially assumed that solenoid 80 is deactivated so that plugs 72 are sealing openings 70. The first steps in the operation are to apply energy to motor 12 to cause cell 20 to start rotating and to operate control 50 to cause electrolyte solution 45 to flow from reservoir 46 into cell 20. When electrolyte solution 45 has substantially covered electrodes 24 and 26, electric current may be applied to the electrodes through lines 30 and 32 and their related, previously described, circuitry. The negative charge applied to electrode 24 and the positive charge applied to electrode 26 cause metal in the electrolyte solution to be separated from the solution and deposited on the outer, metal-collecting face 92 (FIG. 2) of cathode electrode 24. In accordance with the teachings of this invention, it has been found that when cell 20 is rotated at a rate sufficient to cause a substantial centrifugal force (in the order of several hundred times the force of gravity) to be applied in a direction away from metal collecting face 92, the metal is deposited as an array of substantially identical compact nodules of substantially uniform length. FIG. 2 is a pictoral representation of zinc nodules formed from a 37.6% potassium hydroxide water solution having 6% zinc oxide dissolved therein. The dimensions of the electrodes in this experiment are as previously stated and the centrifugal force applied away from face 92 was 250 g. The nodule lengths (i.e., the thickness of the metal deposit) is roughly half the spacing between the electrodes assuring there will not be a short circuiting of the electrodes.

The shape of the nodules formed during deposition on face 92 depends primarily on the configuration of electrode 24 and on the material from which this electrode is formed. If, for example, the squirrel-cage arrangement of FIG. 4 is utilized instead of a wire mesh, the metal nodules will be produced in the form of rods or small sticks. Since different materials have different physical and electrical properties, including adherence, the use of a material other than stainless steel (the material used for the electrodes with the nodules shown in FIG. 2) for electrode 24, such as for example nickel-plated copper which has a higher conductivity and less surface adherence, will also cause the shape of the nodules to vary.

When separation and deposition of metal is continued, the nodules grow bigger until they reach a size, the length of which is less than the distance between the electrodes, where the centrifugal force breaks or tears them off metal-collecting face 92. The openings in anode electrode 26 are selected to be large enough so that the broken-off nodules may pass through this electrode to the side wall of cell 20 in the area of openings 70. since solenoid 80 is initially not activated, the openings 70 are plugged causing the metal nodules 82 to accumulate adjacent to these openings. Because of their greater weight, the centrifugal force causes the nodules 82 to fill the space in cell 20 in the area of opening 70. Electrolyte solution 45 is thus essentially kept out of this area. Solenoid 80 is periodically pulsed to remove plugs 72 from openings 70 to permit nodules 82 to be thrown from cell 20 into housing 10 and, in particular, into the area 84 thereof adjacent nodule removal opening 86. By deenergizing solenoid 80 and causing openings 70 to be replugged before all of the nodules 82 have been removed, the amount of electrolyte which escapes through openings 70 with the nodules during each nodule removal cycle can be minimized. To the extent any electrolyte does escape with the nodules, it passes through openings 90 into cylindrical chamber 66 for recycling or disposal. The nodules removed through tube 88 may be melted down for reuse or otherwise used for any desired purpose.

The electrolyte level or maximum thickness of electrolyte solution in cell 20 is indicated by dotted line 94 and is determined by the placement of electrolyte removal ports 56. since, as has been previously indicated, the electrolyte solution containing the metal-ions is heavier than the metal-poor electrolyte solution from which metal has been deposited on face 92, the electrolyte flows under both the influence of the electric field and of centrifugal force from the outer periphery toward the center of cell 20, as well as flowing, under the influence of gravity, from the top of the cell to the bottom. Thus, the electrolyte removed through ports 56, which is the portion of the electrolyte closest to the axis of rotation of cell 20, is electrolyte from which most or all of the metal ions have been removed (i.e., metal-poor electrolyte). The electrolyte leaving cell 20, through port 56 passes, through chamber 58, openings 64, in wall 62, chamber 66 and tube 68 to be either disposed of or recirculated to reservoir 46.

Since the nodules break off and are removed on a continuous basis, the apparatus shown in FIG. 1 may operate continuously for extended periods of time as long as fresh electrolyte solution containing the metal to be separated is supplied to reservoir 46. Thus, the new and unexpected results achieved by use of the teachings of this invention make possible a continuous mode of electrowinning and of electrodeposition which was not previously possible.

Figure 3:
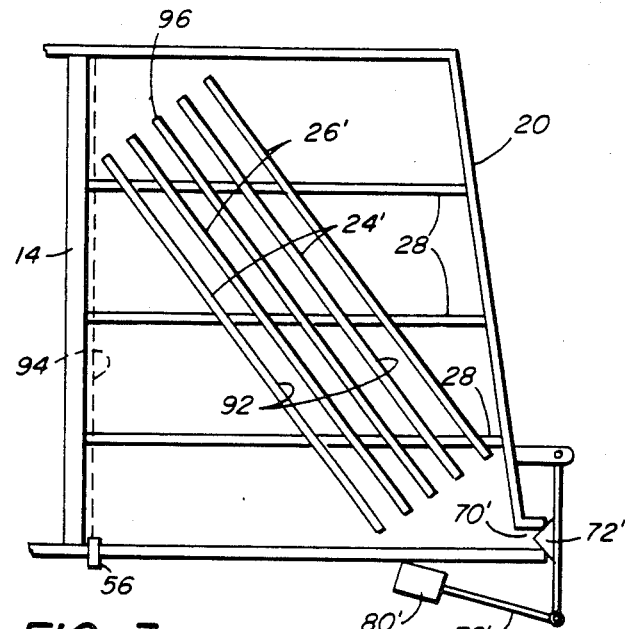
FIG. 3 is a schematic cross-sectional view of a portion of an alternative embodiment of apparatus suitable for practicing the teachings of this invention.

FIG. 3 is a schematic representation of an alternative embodiment for the cell 20 illustrating several modified features. First, instead of having a single concentric pair of anode-cathode electrodes, the embodiment of FIG. 3 has two pairs of such concentric electrodes (24', 26') which, for purposes of illustration, are illustrated as being of the squirrel cage configuration of FIG. 4 rather than the mesh configuration of FIGS. 1 and 2. The two electrode pairs are separated by an insulating member 96 of plastic or other non-conducting material. The four electrodes and the insulating member are supported by non-conducting separators 28.

The electrodes of FIG. 3 also differ from those in FIG. 1 in that they are in the shape of truncated cones rather than cylinders. This configuration has been found advantageous in practicing the teachings of this invention in that the centrifugal force directed at an angle to the metal-collecting faces 92 of the cathode electrodes is more effective in breaking off the metal nodules when the nodules reach the desired size. It is important, however, in order to achieve the nodule-forming capabilities of this invention, that the centrifugal force have a substantial component in a direction perpendicular to the metal collecting race of the cathode electrodes and away therefrom. An angle of approximately 45 degrees for the electrodes has been found to be a suitable angle.

With the configuration shown in FIG. 3, when the metal nodules 82 break off, they drift, under the influence of the centrifugal force, down the sloping electrodes and solid sloping insulating member 96 as well as drifting down the slanting side wall of cell 20, and ultimately accumulate adjacent openings 70' at the bottom of the side wall. Solenoid 80' is periodically pulsed to remove plugs 72' from openings 70' and permit the accumulated metal nodules 82 to escape in the manner previously described.

Figure 5:
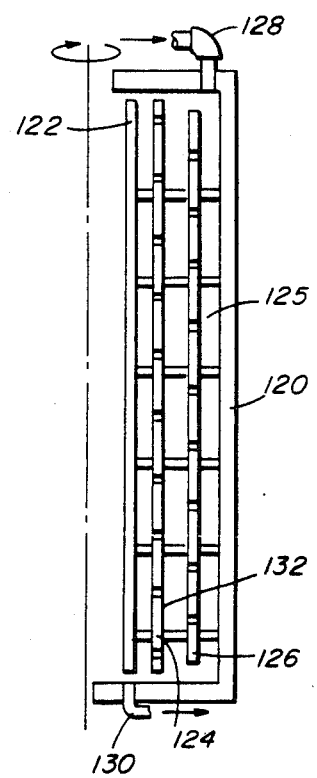
FIG. 5 is a schematic cross-sectional view of a portion of a storage battery which operates in accordance with the teachings of this invention.

Referring now to FIG. 5, an embodiment of the invention is shown which is suitable for use as a rechargeable storage battery. Batteries to which this invention may be applied include zinc-nickle and zinc-air batteries, with the embodiment shown in FIG. 5 being, for purposes of illustration, a zinc-air battery. In FIG. 5, the cell housing 120 has mounted therein three concentric cylindrical electrodes, a positive air electrode 122, a zinc electrode 124 which is the battery cathode, and a positive charging electrode 126 which is used during recharging of the battery. Electrolyte 125 is applied through tube 128 to cell 120, flows through the cell in the manner previously indicated, and is removed from the cell through tube 130. Tube 130 connects to tube 28 to recirculate the electrolyte during both charge and discharge to prevent the loss of the zinc from electrode 124, the zinc being deposited in the electrolyte during discharge of the battery. During charging of the battery, an electric current is applied, in the manner previously indicated, between electrodes 124 and 126 and the electrolyte solution having zinc ions deposited therein is recirculated through tubes 128 and 130 until substantially all of the zinc in the electrolyte solution has been deposited on metal collecting face 132 of zinc electrode 124 in the form of substantially uniform nodules of the type shown in FIG. 2. The quantity of zinc in the electrolyte and the charging time are not sufficient to permit the zinc nodules to reach a size which would cause them to break off. Any electrolyte which is lost through evaporation or otherwise may be replaced either manually or automatically at some point in the recirculation cycle of the electrolyte, either prior to or during charge, discharge or both.

While the preferred embodiments described above have utilized zinc as the metal to be deposited from the electrolyte solution, it is apparent that the teachings of this invention could be utilized to separate and deposit most metals, including any metal which can be dissolved in an electrolyte solution as ions. Further, while several configurations for the electrodes have been shown and described, it is apparent that numerous other configurations are possible while still practicing the teachings of this invention and that other materials, in addition to stainless steel and nickel-plated copper may be used for such electrodes. The applications to which the metal separation method and apparatus of this invention may be applied also are not limited to those specifically disclosed. Thus, while the invention has been particularly shown and described with reference to various preferred embodiments, it is to be understood that the foregoing and other changes in form and detail may be made therein by one skilled in the art without departing from the spirit and scope of the invention.

What is claimed is:

1. A process for depositing a metal from a solution containing said metal onto a metal-collecting face of a cathode electrode, said cathode electrode and an anode electrode, mounted with a face substantially parallel to said metal-collecting face, forming part of an electrochemical cell, comprising the steps of:
providing said solution to said cell at least in the area thereof between said electrodes;
applying a substantial centrifugal force to said electrodes and said solution, said force having a substantial component in a direction perpendicular to and outward from the metal collecting face; and
applying an electric current to said electrodes.

2. A process as claimed in claim 1 wherein said solution is an electrolyte solution containing ions of the metal;
wherein said cell is a rotatable cell;
wherein said electrodes are mounted in said cell (a) with said faces substantially parallel to each other and spaced from each other by a predetermined distance, (b) oriented in said cell relative to the axis of rotation of the cell such that when the cell is rotated, the resulting centrifugal force applied to said electrode faces has a substantial component in a direction perpendicular to said faces and (c) with the cathode electrode closer to said axis of rotation than said anode electrode so that the perpendicular component of the centrifugal force applied to the metal-collecting face of said cathode electrode is in a direction away from said face; and
including the step of rotating said cell, and thus said electrodes and the electrolyte solution therebetween, about said axis of rotation, whereby said centrifugal force is generated.

3. A process as claimed in claim 2 wherein said providing step includes causing said electrolyte solution to continuously flow through said cell at a controllable rate.

4. A process as claimed in claim 3 wherein the metal is deposited from said electrolyte onto said metal collecting face; and wherein, as a result of the centrifugal forces exerted on the electrolyte, the metal-poor electrolyte from which the metal ions have been removed is moved toward the rotation axis of said cell; and
including the step of removing the metal-poor, innermost electrolyte from the cell.

5. A process as claimed in claim 2 wherein, as a result of the charge applied to said electrodes and of the centrifugal force applied thereto, metal is deposited from said electrolyte solution onto said metal collecting face in the form of nodules of a predetermined shape and of substantially uniform configuration.

6. A process as claimed in claim 5 wherein the predetermined shape of said nodules is determined at least in part by the configuration of said cathode electrode.

7. A process as claimed in claim 6 wherein said cathode electrode is in the form of a wire mesh.

8. A process as claimed in claim 6 wherein said cathode electrode is in the form of an array of parallel wires.

9. A process as claimed in claim 5 wherein the shape of said nodules is determined at least in part by the material from which said cathode electrode is constructed.

10. A process as claimed in claim 9 wherein said cathode electrode is formed of stainless steel.

11. A process as claimed in claim 9 wherein said cathode electrode is formed of nickel-plated copper.

12. A process as claimed in claim 5 wherein, when said metal nodules reach a size which is less than the predetermined distance between said electrodes, they break off from said metal collecting face; and
including the step of removing the broken off nodules from said cell.

13. A process as claimed in claim 12 wherein said removing step includes utilizing the centrifugal force to move the broken off metal nodules to the periphery of said cell and through a nodule removing opening in said periphery.

14. A process as claimed in claim 2 wherein said electrodes are oriented in said cell substantially parallel to the axis of rotation of the cell.

15. A process as claimed in claim 2 wherein said electrodes are oriented in said cell with said faces at an angle to the axis of rotation of said cell.

16. A process as claimed in claim 15 wherein, under the influence of said electric current applied to the electrodes and the centrifugal force applied to the electrodes, metal is deposited from said electrolyte solution onto said metal collecting face in the form of nodules having a predetermined shape;
wherein, when said nodules reach a size which size is less than the spacing between said faces of the electrodes, said modules break off from said metal collecting face; and
including the step of utilizing said angled electrodes and said centrifugal force to guide said broken off nodules to a nodule removal opening at the periphery of said cell.

17. A process as claimed in claim 2 when said electrodes are in the form of concentric cylinders, the axis of which are said axis of rotation.

18. A process as claimed in claim 2 wherein said electrodes are in the form of concentric truncated cones the axis of which are the axis of rotation of said cell.

19. A process as claimed in claim 18 werein there are a plurality of pairs of said cathode and anode electrodes, each cathode-anode pair of electrodes being separated from the adjacent pair by a conical member of a nonconducting material.

20. A process as claimed in claim 1 wherein there are a plurality of pairs of cathode and anode electrodes.

21. A process as claimed in claim 1 wherein the metal being deposited on the metal collecting face is zinc.

22. A process as claimed in claim 2 wherein said cell is rotated at a rate such that said centrifugal force is in the order of several hundred times the force of gravity.

23. Apparatus for depositing a metal from an electrolyte solution containing ions of the metal comprising:

a cell rotatable about an axis;

at least one cathode electrode having a metal-collecting face;

at least one anode electrode having an inner face;

means for mounting said electrodes in said cell with said metal-collecting face of said cathode and said inner face of said anode substantially parallel to each other and spaced by a predetermined distance, said cathode being mounted closer to said cell axis than said anode and said electrodes being oriented in the cell such that, when said cell is rotated, the resulting centrifugal force has a substantial component in a direction perpendicular to said faces and directed outward and away from said metal-collecting face;

means for providing said elecrolyte solution to said cell at least in the area between said electrodes;

means for rotating said cell about its axis at a rate sufficient to cause a substantial centrifugal force to be applied to said metal-collecting face, said electrodes and electrolyte being rotated with said cell; and means for applying an electric current to said electrodes.

24. Apparatus as claimed in claim 23 wherein the metal is deposited from the electrolyte onto said metal-collecting face;

wherein, as a result of the centrifugal force exerted on the electrolyte, the metal-poor electrolyte from which the metal ions have been removed is moved toward the rotation axis of said cell; and including means for causing the electrolyte solution to continuously flow through said cell at a controllable rate, said means including means for removing the metal-poor, innermost electrolyte from the cell.

25. Apparatus as claimed in claim 23 wherein, as a result of a charge applied to said electrodes and of the centrifugal force applied thereto, metal is deposited from said electrolyte solution onto said metal-collecting face in the form of nodules of a predetermined shape and of substantially uniform configuration.

26. Apparatus as claimed in claim 25 wherein the predetermined shape of said nodules is determined at least in part by the configuration of said cathode electrode; and wherein said cathode electrode is in the form of a wire mesh.

27. Apparatus as claimed in claim 25 wherein the predetermined shape of said nodules is determined at least in part by the configuration of said cathode electrode; and wherein said cathode electrode is in the form of an array of parallel wires.

28. Apparatus as claimed in claim 25 wherein the shape of said nodules is determined at least in part by the material from which said cathode electrode is constructed; and wherein said cathode electrode is formed of stainless steel.

29. Apparatus as claimed in claim 25 wherein the shape of said nodules is determined at least in part by the material from which said cathode electrode is constructed; and wherein said cathode electrode is formed of nickel-plated copper.

30. Apparatus as claimed in claim 25 wherein, when said metal nodules reach a size which is less than the predetermined distance between said electrodes, they break off from said metal-collecting face; and including means for removing the broken-off nodules from said cell.

31. Apparatus as claimed in claim 30 wherein said means for removing the broken-off nodules includes at least on nodule removing opening in the periphery of said cell and means for utilizing said centrifugal force to guide the broken-off nodules to said opening.

32. Apparatus as claimed in claim 23 wherein said electrodes are oriented in said cell substantially parallel to the axis of rotation of the cell.

33. Apparatus as claimed in claim 23 wherein said electrodes are oriented in said cell with said faces at an angle to the axis of rotation of the cell.

34. Apparatus as claimed in claim 23 wherein said electrodes are in the form of concentric cylinders, the axis of which are said axis of rotation.

35. Apparatus as claimed in claim 23 wherein said electrodes are in the form of concentric truncated cones, the axis of which are the axis of rotation of said cell.

36. Apparatus as claimed in claim 35 wherein there are a plurality of pairs of said cathode and anode electrodes; and including a conical member of a non-conducting material separating each of said anode-cathode pairs.

37. Apparatus as claimed in claim 23 wherein there are a plurality of pairs of cathode and anode electrodes.

38. Apparatus as claimed in claim 23 wherein the metal being deposited on the metal-collecting face is zinc.

39. Apparatus as claimed in claim 33 wherein said means for rotating said cell is operative to rotate said cell at a rate such that said centrifugal force is in the order of several hundred times the force of gravity.

* * * * *